United States Patent [19]

Mayer

[11] 4,330,094
[45] May 18, 1982

[54] METHOD AND APPARATUS FOR MEASURING THE LENGTH OF A THREAD WITHDRAWN OVERHEAD FROM A THREAD CARRIER

[76] Inventor: Stephan Mayer, Im Ried, 8112 Otelfingen, Switzerland

[21] Appl. No.: 128,560

[22] Filed: Mar. 10, 1980

[30] Foreign Application Priority Data

Mar. 26, 1979 [CH] Switzerland ............... 2763/79

[51] Int. Cl.³ .................. B65H 63/00; B65H 63/08
[52] U.S. Cl. ............................ 242/36; 57/81; 57/265; 242/39
[58] Field of Search .............. 242/36, 37 R, 39, 49, 242/28, 29, 30; 57/81, 265

[56] References Cited

U.S. PATENT DOCUMENTS

| | | | |
|---|---|---|---|
| 3,860,185 | 1/1975 | Makino et al. | 242/36 |
| 3,966,132 | 6/1976 | Gelin | 242/36 |
| 4,010,908 | 3/1977 | Patterson | 242/36 |
| 4,256,247 | 3/1981 | Loepfe | 242/36 X |

FOREIGN PATENT DOCUMENTS

| | | |
|---|---|---|
| 1273861 | 7/1968 | Fed. Rep. of Germany. |
| 2433394 | 1/1975 | Fed. Rep. of Germany ........ 242/36 |
| 2621196 | 12/1977 | Fed. Rep. of Germany .... 242/37 R |

Primary Examiner—Stanley N. Gilreath
Attorney, Agent, or Firm—Werner W. Kleeman

[57] ABSTRACT

There is measured the length of a thread withdrawn overhead from a spinning cop or from a yarn bobbin. In order to circumvent the fault sources caused by slip and/or thread elongation there is generated a signal which periodically varies in accordance with the movement of the thread release or detachment point at the spinning cop or at the yarn bobbin, as the case may be, and there are counted the number of cycles of the fundamental frequency of this signal. The thread length is obtained by multiplication of the counted number of cycles by the constant thread length of two successive winding layers for spinning cops or yarn bobbins of the same origin and the same thread. The periodic signal can be derived from the thread withdrawal force or from the number of revolutions of the detachment point. The method is particularly suitable when rewinding a number of spinning cops on to a cross-wound bobbin.

13 Claims, 4 Drawing Figures

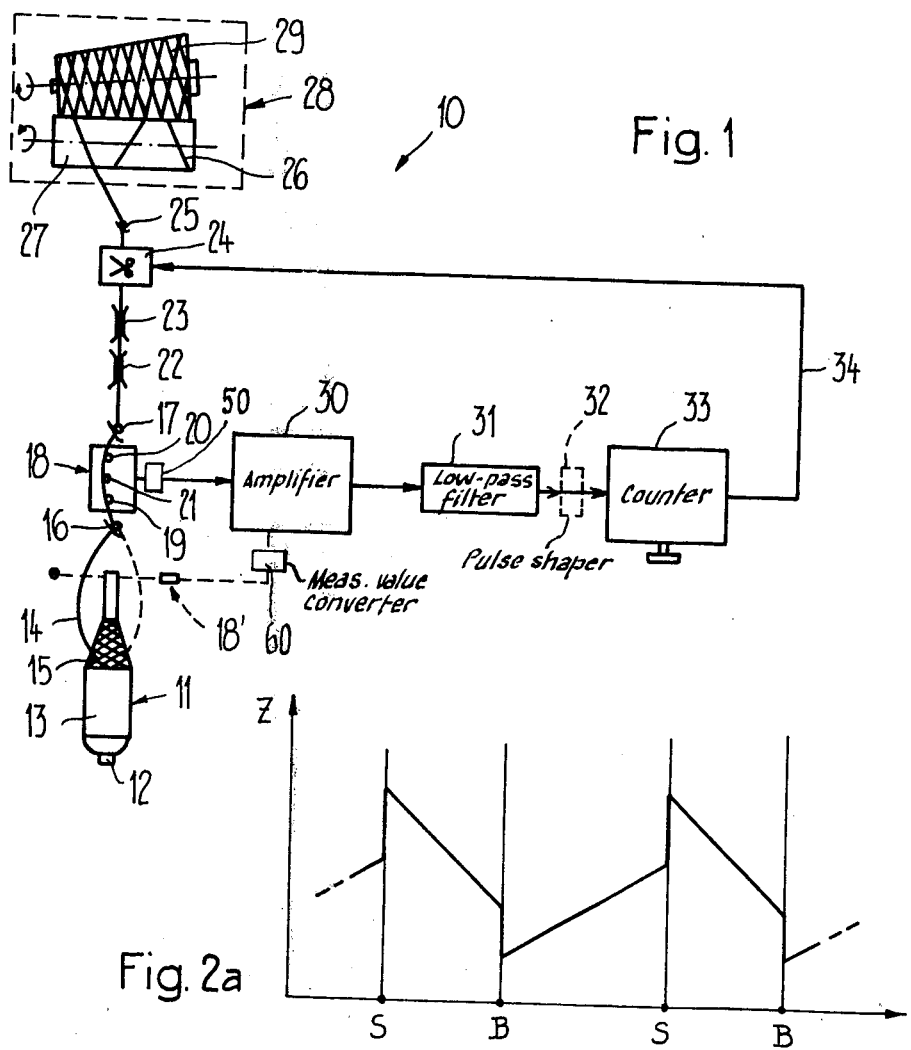
Fig. 1
Fig. 2a
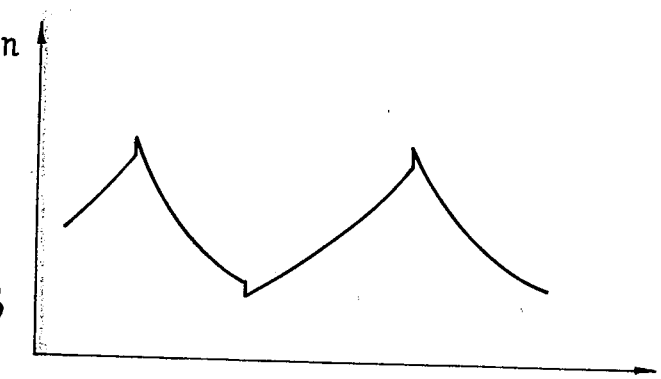
Fig. 2B

METHOD AND APPARATUS FOR MEASURING THE LENGTH OF A THREAD WITHDRAWN OVERHEAD FROM A THREAD CARRIER

BACKGROUND OF THE INVENTION

The present invention relates to a new and improved method and apparatus for measuring the length of a thread or the like withdrawn overhead from a spinning cop or a yarn bobbin wound on a spinning cop or a random crosswound bobbin. The invention equally relates to the use of the inventive method.

In the context of this disclosure the term "thread" is used in its broader sense to mean threads, yarns, and generally other types of filamentary materials.

The method can be used both for all pirns where the thread length of a winding layer or the thread length of two successive winding layers is constant. This is not the case for instance with so-called "precision windings". Prior to further processing the yarn, for instance present from the spinning machine in the form of a spinning cop, as a rule is rewound at another winding body, accommodated to the next following processing step, for instance into a cross-wound package, wherein during the course of the winding operation there is also brought about an improvement in the yarn quality, for instance through the use of a yarn clearer. If the formed wound bodies or packages are parallelly processed during the next following processing step, then irregular thread lengths upon these wound bodies lead to bothersome phenomena which retard the production, for instance, cause premature shutdown of the textile machine and increased work expenditure for preparing the winding residues.

Therefore, methods and apparatuses have already been proposed in the art in order to measure the length of the thread at the formed wound bodies, while striving to maintain as constant as possible the length for all the formed wound bodies.

For instance, a method is known from Swiss Pat. No. 588,067 wherein from the diameter of a cross-wound bobbin which is directly driven at its shaft and takes-up the payed-off thread and from the number of revolutions carried out by this cross-wound bobbin it is possible to determine the length of the wound-up thread through the use of an appreciable expenditure in electronic equipment. The computed value obtained according to this procedure is hardly satisfactory, because there is extensively not taken into consideration the correlation between diameter and winding density at the formed cross-wound package.

With other heretofore known devices, for instance as disclosed in Swiss Pat. No. 597,589 and Swiss Pat. No. 568,233, there is derived the length of the withdrawn thread from the number of revolutions of either the friction drum which drives the winding body to be wound at a constant circumferential speed or the withdrawl drum which withdraws the thread. This procedure does not take into account the unavoidable and irregular slip between the friction drum and the winding body or between the withdrawl drum and the withdrawn thread, so that the "measured length", as a general rule, is larger than the "true length" of the withdrawn thread.

Finally, with the equipment disclosed in Swiss Pat. No. 473,378 the withdrawn thread is frictionally driven by means of a measuring roll and predictated upon the number of revolutions of the measuring roll there is attempted to be determined the length of the thread which is drawn over the measuring roll. Also in this case there is not taken into account the unavoidable and irregular ship which arises between the thread and the measuring roll.

SUMMARY OF THE INVENTION

Therefore, with the foregoing in mind it is a primary object of the present invention to provide a new and improved method and apparatus for measuring the length of a withdrawn thread or the like in a manner not afflicted with the aforementioned drawbacks and limitations of the prior art proposals.

Another and more specific object of the invention aims at providing a new and improved method and apparatus for measuring thread length, wherein the error sources of the heretofore mentioned, known proposals can be circumvented, and there is possible a measurement which is accurate within a fraction of a percent of the thread withdrawn overheat from a spinning cop or from a yarn bobbin or package.

Another and more specific object of the present invention aims at providing a novel method of and apparatus for measuring the length of a withdrawn thread wherein the measurement is effected at the location where the thread is payed-off from an unwound thread supply.

Yet a further significant object of the present invention is to provide a novel method of and apparatus for measuring thread lengths in an extremely efficient, reliable and accurate fashion, with improved accuracy in the measurement result over the prior art proposals heretofore discussed.

The invention exploits recognitions gained in conjunction with the formation of a spinning cop or the yarn spool from which there is withdrawn the thread.

At a spinning machine all of the spinning locations are driven by a common main drive. The infeed velocity of the yarn supply (drafting arrangement) as well as the drive (heart-shaped eccentric) for the stroke of the thread guide operatively associated with the spinning cop are in a fixed relationship to one another. This relationship determines the true thread length per double stroke of the thread guide, i.e. for two successive winding layers upon the formed spinning cop and is the same for all spinning locations of the same spinning machines.

This also is generally true for winding bodies where, during the formation thereof, there exists a fixed relationship between the yarn infeed per unit of time and the number of double strokes of the yarn or thread guide per unit of time. This is equally true in the case of random cross-wound bobbins. During the winding operation of such random cross-wound bobbins, the bobbin is driven at its circumferential and there is a fixed relation between the bobbin drive and the to-and-fro movement of the thread guide through which the thread to be wound on the bobbin is guided.

As a result, for all spinning cops formed at a spinning machine and for a spinning cop or random cross-wound bobbin formed at a certain winding machine the length of the thread of two successive winding layers is constant.

Predicated upon this recognition there has now been proposed for the measurement of the length of a thread drawn overhead from a spinning cop or from a yarn bobbin or a random cross-wound bobbin, the generated of a signal which periodically varies as a function of the movement of the thread detachment or release point at the spinning cop or at the yarn bobbin, as the case may be, and there are counted the cycles of the fundamental frequency of this signal.

As will be demonstrated more fully hereinafter the periodic signal is derived from the thread withdrawl force, which can vary as a function of the momentary position and direction of movement of the thread release point at the spinning cop or the like, or however also this signal can be derived from the number of revolutions of the thread release point at the spinning cop or at the yarn bobbin, as the case may be.

Therefore, it is sufficient for a certain thread or yarn quality and, for instance, for spinning cops emanating from the same spinning machine, to measure the thread length of two successive winding layers, i.e., the thread length per double stroke, and then to multiply such with the number of counted cycles of the signal. On the other hand, when working with a spinning cop or a random cross-wound bobbin it is sufficient to measure the thread length of a winding layer and to multiply the measured length by two and by the number of counted cycles.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic illustration of apparatus suitable for the practice of the inventive method;

FIGS. 2a and 2b are simplified graphical illustrations of the time course of the thread withdrawl force and the number of revolutions of the thread detachment point during the course of withdrawl of the thread from a spinning cop.

DETAILED DESCRIPTION OF THE PREFERRED EMBODIMENTS

Figure 3:
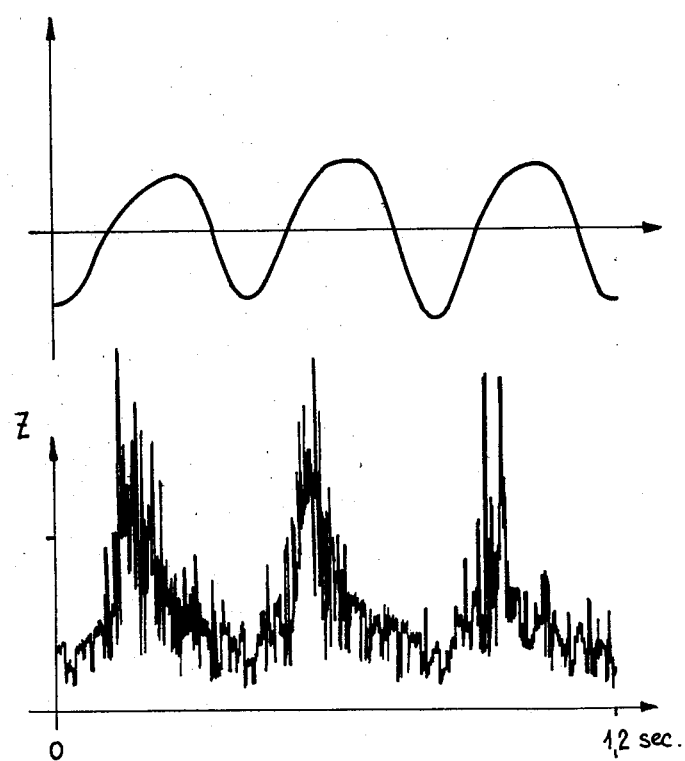
FIG. 3 are oscillographs of the signals formed at two different locations with the arrangement shown schematically in FIG. 1.

Describing now the drawings, with the schematically illustrated apparatus 10 shown by way of example in FIG. 1 there will be recognized a spinning cop 11 or equivalent which carries a wound body or thread package 13 which is wound upon a sleeve or bobbin 12. A thread 14 is withdrawn from this wound body or package 13. The thread 14 leaves the wound thread package 13 at a thread release or detachment point 15, which during the thread withdrawl operation revolves about the package 13 and as a function of the ascent of the wound layers upon the package 13 moves up and down. The winding layers in the wound package 13 define a truncated cone. The withdrawn thread 14 is guided through two stationary thread guides 16 and 17 arranged essentially coaxially with respect to the spinning cop 11. Between both of the thread guides 16 and 17 the thread 14 is guided through a conventional measuring head 18 for measuring the thread tension force. This measuring head 18 comprises a feeler or sensing element 21 here shown as a feeler or sensor pin, arranged between two immobile guide pins 19 and 20 and attached to a schematically shown conventional transducer, generally indicated by reference character 50. The transducer 50, which can be a piezoelectric transducer or a standard strain gauge transducer, and operatively associated with the feeler pin 21 delivers an electrical signal as a function of the amount by which the feeler pin 21 is forced by the contacting thread 14 towards the straight line which interconnects the guide pins 19 and 20. Hence, the generated signal is characteristic, among other things, of the thread tension force.

The thread 14 departing from the thread guide 17 is guided through two thread brakes 22 and 23 and through a schematically shown, standard electrically operated cutter device 24, before it reaches, by means of a further thread guide 25, the drive friction drum 27 of a conventional winding machine 28. The drive friction drum 27 can be provided, for instance, with a reversing helical-shaped thread guide groove 26 as is well known in the textile winding art. At the location of the winding machine 28 the infed thread 14 is wound into a new package, for instance into a conical cross-wound package 29 which is driven by the friction drum 27.

The measuring head 18 is connected with an amplifier 30 following which there is arranged a low-pass filter 31. The low-pass filter 31, if desired, may be connected by means of a pulse shaper 32, for instance constituted by a standard voltage comparator or monostable multivibrator, with a pre-selection counter 33. This counter 33 counts the number of cycles of the fundamental frequency of the signal generated by the measuring head 18. The counter state or value determined by the counter 33, as will be demonstrated more fully hereinafter, is directly proportional to the length of the thread which travels through the measuring head 18. The counter 33 can deliver an output signal by means of an output line or conductor 34 as soon as the counter value or state has reached a value which has been preset at the counter 33. This output signal, in turn, can be used for controlling further devices, such as here for the actuation of the cutter device 24.

Predicated upon FIG. 2a there will be briefly explained the reason why the signal generated by the measuring head 18, i.e. the thread withdrawal force contains fluctuations which coincide with the position of the thread release or detachment point 15.

The winding layers upon a spinning cop, as already mentioned, have the shape of a truncated cone. If the thread 14 is withdrawn from the cop 11, then the thread release or detachment point 15 (apart from its revolving motion) migrates back-and-forth between the base and the tip or apex of such truncated cone. With essentially constant thread withdrawal speed the thread detachment point 15 moves more rapidly at the apex of the truncated cone than at its base. During the movement of the thread detachment point 15 towards the apex of the truncated cone there is present a greater amount of the thread, whereas during the movements of the thread detachment point towards the base a greater amount of thread must be released by increased revolving motion of the thread detachment point. Due to the revolving of the thread detachment point 15 the withdrawn thread experiences a centrifugal force, i.e. the thread describes a so-called balloon. The centrifugal force which is effective at the drawn-off thread 14 is proportional to the square of the number of revolutions of the thread balloon, and such corresponds to the number of revolutions of the thread detachment point 15. The tension force, which is applied to the thread 14 during its passage through the measuring head 18, is dependent upon the centrifugal force. If these characteristics are analyzed, then it will be appreciated that the tension force of the thread varies in a manner as illustrated by way of explanation in FIG. 2a. When the thread detachment point 15 approaches the apex of the truncated cone, then the tension force Z gradually increases owing to increasing number of revolutions. Once the thread detachment point 15 reaches the apex of the truncated cone, represented by point S in FIG. 2a, then the tension force increases in a sudden or surge-like fashion, because the number of revolutions of the thread balloon suddenly increases directly at the start of the movement of the thread detachment point towards the base of the truncated cone. During this movement in the direction of the base of the truncated cone the tension force again gradually reduces. Upon reaching the base of the truncated cone, signified by point B in FIG. 2a, the number of revolutions of the thread balloon and in conjunction therewith also the tension force decreases in a sudden or surge-like fashion, in order to then again gradually increase. Therefore, the tension force in the thread 14 is subjected to stark periodic fluctuations which are predicated upon the movement of the thread detachment point 15 at the spinning cop 11.

Of course, the meausuring head also detects all irregularities at the surface of the thread, so that the signal delivered by the measuring head 18 also contains higher-frequency components. In reality the oscillograph at the bottom portion of FIG. 3 of the signal tapped-off at the output side of the amplifier 30 clearly shows a fundamental frequency upon which there are superimposd numerous higher-frequency components. These higher-frequency components are filtered out by the low-pass filter 31 which, for instance, can be set to a frequency between 5 and 10 Hz, so that at the output side of the low-pass filter 31 there only appears a signal, represented schematically at the upper porton of FIG. 3, which essentially portrays the aforementioned fundamental frequency.

For deriving the periodic signal which appears with the movement or migration of the thread detachment point 15 it is possible to use, instead of the thread tension force Z, also the number of revolutions n of the thread balloon, i.e. the number of revolutions of the thread detachment point 15 itself. From the previous observations and comments it will be recognized that such number of revolutions n periodically vary, as illustrated in FIG. 2b,—it is mentioned by way of completeness that neither FIG. 2a nor FIG. 2b are intended to provide illustrations which can be considered to be to scale, rather only have been presented for illustrative purposes. Such number of rotations or revolutions, as schematically shown in FIG. 1, can be detected in a contactless fashion through the use of suitable means, here shown in the form of a light barrier 18'. The signal of the light barrier 18' then can be infed to the amplifier 30 by means of, for instance a standard measuring value converter 60 which converts the momentary interruption frequency into a corresponding voltage signal.

Finally, based upon the two Examples given hereinafter which have been carried out in practice there will be demonstrated the accuracy of the thread length measurement which can be obtained with the practice of the described method, it being mentioned that under the expression "meeaured length" there is to be understood the length of the thread which is withdrawn from the related cop and determined according to the teachings of the inventive method, and under the expression "true length" the actual withdrawn length of the thread.

EXAMPLE 1

| Cotton yarns, fineness 50 tex (g/1000 m) Withdrawal speed 700 m/min | | | | |
|---|---|---|---|---|
| Cop No. | Measured Length (m) | True Length (m) | Length difference in (m) | Length difference in (%) |
| 1 | 4929 | 4933 | −4 | 0.08 |
| 2 | 4406 | 4402 | +4 | 0.09 |
| 3 | 4697 | 4698 | −1 | 0.02 |
| 4 | 4938 | 4942 | −4 | 0.08 |
| 5 | 4838 | 4846 | −8 | 0.16 |
| Average value | 4761.6 | 4764.2 | −2.6 | 0.055 |
| Standard Deviation | the length difference 4.4m | or | Variation coefficient: 0.09% | |

EXAMPLE 2

| Cotton yarn, fineness 20 tex Withdrawal speed 800 m/min | | | | |
|---|---|---|---|---|
| Cop No. | Measured Length (m) | True Length (m) | Length difference in (m) | Length difference in (%) |
| 1 | 6473 | 6428 | +45 | 0.7 |
| 2 | 5667 | 5644 | +23 | 0.41 |
| 3 | 6431 | 6411 | +20 | 0.31 |
| 4 | 6466 | 6436 | +30 | 0.47 |
| 5 | 6481 | 6461 | +20 | 0.31 |
| Average value | 6303.6 | 6276 | +27.6 | 0.44 |
| Standard Deviation | the length difference 10.6m | or | Variation coefficient: 0.17% | |

If it is assumed, and correctly, that in practice a number of spinning cops are wound into a single cross-wound package, then the statistical average value of the variation coefficient further reduces. When all five spinning cops of the Examples 1 and 2 were each rewound into a respective single cross-wound package, then for Example 1 there was obtained a variation coefficient of $0.09/\sqrt{5}=0.04\%$, and for the Example 2 a variation coefficient of $0.17/\sqrt{5}=0.076\%$.

While there are shown and described present preferred embodiments of the invention, it is to be distinctly understood that the invention is not limited thereto, but may be otherwise vriously embodied and practiced within the scope of the following claims. Accordingly,

What I claim is:

1. A method of measuring the length of a thread withdrawn overhead from a thread carrier, in particular a spinning cop or a random cross-wound bobbin, comprising the steps of:

keeping the thread carrier stationary;

withdrawing the thread from overhead of the thread carrier, thus causing the thread detachment point at the thread carrier to perform a movement, such movement comprising an axially reciprocating component;

generating a signal which periodically varies in accordance with the axially reciprocating component of the movement of the thread detachment poin at the thread carrier; and counting the cycles of the fundamental frequency of such signal.

2. The method as defined in claim 1, further including the steps of:
deriving the periodic signal from the periodic variations of the thread withdrawal force.

3. The method as defined in claim 1, further including the steps of:
deriving the periodic signal from the periodic variations of the number of revolutions of the thread detachment point at the thread carrier.

4. The method as defined in claim 1, further including the steps of:
generating an output signal when the number of counted cycles has reached a preset value.

5. The method as defined in claim 1, further including the steps of:
said thread carrier defining a first thread carrier;
providing a further thread carrier onto which there is wound the thread withdrawn from the first thread carrier; and
cutting the thread withdrawn from the first thread carrier and infed to the further thread carrier as soon as the number of counted cycles has reached a pretermined value.

6. The method as defined in claim 5, wherein:
the further thread carrier is a cross-wound package.

7. An apparatus for measuring the length of a thread withdrawn overhead from a thread carrier comprising:
a thread carrier, in particular a spinning cop or a random cross-wound bobbin, from which the thread is withdrawn overhead and the thread detachment point at the thread carrier has an axially reciprocating component of movement with respect to the thread carrier;
means for withdrawing the thread off of said thread carrier;
signal generating means arranged following the thread carrier for detecting the course of the withdrawn thread and for producing a signal periodically varying in unison with the axially reciprocating component of the movment of the thread detachment point at the thread carrier when thread is being withdrawn therefrom; and
counter means operatively coupled to said signal generating means.

8. The apparatus as defined in claim 7, wherein:
said signal generating means comprises a thread tension force-measuring head means for delivering an electrical signal which varies periodically in accordance with the periodic variations of the tension of the thread being withdrawn;
said counter means comprising a pre-selection counter; and
low-pass filter means for delivering said electrical signal from said measuring head means to said pre-selection counter.

9. The apparatus as defined in claim 8, further including:
signal shaper means arranged following said low-pass filter means.

10. The apparatus as defined in claim 9, wherein:
said signal shaper means comprises voltage comparator means.

11. The apparatus as defined in claim 9, wherein:
said signal shaper means comprises a monostable multivibrator.

12. The apparatus as defined in claim 7, wherein:
said signal generating means comprises a contactless signal transmitter for detecting the periodic variations of the number of revolutions of a balloon formed by the thread withdrawn from the thread carrier, sid signal transmitter being coupled via a measuring value converter to said counter means.

13. The apparatus as defined in claim 12, wherein:
said signal transmitter comprises a photoelectric signal transmitter.

* * * * *